(12) United States Patent
Schultz et al.

(10) Patent No.: US 10,272,460 B2
(45) Date of Patent: *Apr. 30, 2019

(54) REFILLABLE DISPENSING SYSTEMS AND COMPONENTS

(71) Applicant: Ecolab USA Inc., St. Paul, MN (US)

(72) Inventors: Jeffrey M. Schultz, Hudson, WI (US); Kenneth T. Dobizl, Mounds View, MN (US); Brian L. Sholes, Minneapolis, MN (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/815,366

(22) Filed: Nov. 16, 2017

(65) Prior Publication Data

US 2018/0071762 A1 Mar. 15, 2018

Related U.S. Application Data

(63) Continuation of application No. 14/932,761, filed on Nov. 4, 2015, now Pat. No. 9,827,582.

(51) Int. Cl.
*B05B 11/00* (2006.01)
*F16K 15/04* (2006.01)
(Continued)

(52) U.S. Cl.
CPC ............ *B05B 11/3045* (2013.01); *A47K 5/12* (2013.01); *B05B 11/0044* (2018.08);
(Continued)

(58) Field of Classification Search
CPC ............. B05B 11/0016; B05B 11/0054; B05B 11/0056; B05B 11/3043; B05B 11/0059;
(Continued)

(56) References Cited

U.S. PATENT DOCUMENTS 682,103 A 9/1901 Meyenberg
3,718,165 A * 2/1973 Grothoff ................... B65B 3/04
137/583

(Continued)

FOREIGN PATENT DOCUMENTS

EP 1006415 A1 6/2000
EP 2385919 A1 11/2011
(Continued)

OTHER PUBLICATIONS

International Search Report and Written Opinion for counterpart International Application No. PCT/US02015/058965, dated Feb. 14, 2016, 9 pp.

(Continued)

*Primary Examiner* — Lien Ngo
(74) *Attorney, Agent, or Firm* — Shumaker & Sieffert, P.A.

(57) ABSTRACT

A closed-loop refillable dispensing system may include one or more reusable or refillable product packages configured to dock with an automated filling station. The automated filling station automatically mixes concentrated chemical product with a diluent and dispenses the resulting chemical product solution. The product package may include a fitment insert configured to mate with a docking connector at the automated filling station. When the product package is removed from the docking connector, the fitment insert provides a positive, leak-proof seal for the product package.

20 Claims, 12 Drawing Sheets

(51) Int. Cl.
*A47K 5/12* (2006.01)
*F16K 27/02* (2006.01)

(52) U.S. Cl.
CPC .......... *B05B 11/0054* (2013.01); *F16K 15/04* (2013.01); *F16K 15/044* (2013.01); *F16K 27/0209* (2013.01); *F16K 27/0245* (2013.01)

(58) Field of Classification Search
CPC ............. B05B 11/0078; B05B 11/3081; B05B 11/3045; B05B 11/0044; F16L 11/04; F16K 27/0209; F16K 27/0245; F16K 15/044; F16K 15/04
USPC .................. 222/173, 181.1–181.3, 185.1
See application file for complete search history.

(56) References Cited

U.S. PATENT DOCUMENTS

| | | | |
|---|---|---|---|
| 5,816,298 | A | 10/1998 | Stricklin et al. |
| 6,126,045 | A | 10/2000 | Last |
| 6,276,788 | B1 | 8/2001 | Hilton |
| 6,851,579 | B2 | 2/2005 | Savage et al. |
| 6,871,679 | B2 | 3/2005 | Last |
| 7,665,635 | B2 | 2/2010 | Ramet et al. |
| 7,690,528 | B2 | 4/2010 | Last |
| 8,292,121 | B2 | 10/2012 | Davideit et al. |
| 8,413,857 | B2 | 4/2013 | Johnson |
| 8,499,980 | B2 | 8/2013 | Hagleitner |
| 8,590,752 | B2 | 11/2013 | Mileti |
| 8,739,839 | B2 | 6/2014 | Muller |
| 8,851,331 | B2 | 10/2014 | Pelkey et al. |
| 8,991,655 | B2 | 3/2015 | Pelkey |
| 9,146,144 | B2 | 9/2015 | Hui et al. |
| 2007/0160785 | A1 | 7/2007 | Hsu et al. |
| 2012/0267393 | A1* | 10/2012 | Pritchard ............. B67D 7/0294 222/92 |
| 2013/0199662 | A1 | 8/2013 | Gebbink et al. |
| 2017/0120274 | A1 | 5/2017 | Schultz et al. |

FOREIGN PATENT DOCUMENTS

| | | |
|---|---|---|
| WO | 2009017390 A1 | 2/2009 |
| WO | 2010080893 A1 | 7/2010 |
| WO | 2011071897 A3 | 6/2011 |
| WO | 2011130161 A1 | 10/2011 |

OTHER PUBLICATIONS

"Cleaning Power—where and when you need it", 3M Chemical Management Systems, Commercial Solutions Division, 2014, 6 pp. (Applicant points out that, in accordance with MPEP 609.04(a), the 2014 year of publication is sufficiently earlier than the effective U.S. filing date and any foreign priority date of Nov. 4, 2015 so that the particular month of publication is not in issue).

"Twist 'n Fill Cleaning Chemical Management System Dispenser Technical Data", 3M, Building and Commericial Services Division, Oct. 2010, 2 pp.

"Store and Manage Chemicals simply and securely", 3M Twist 'n Fill Dispenser Cabinet, 2011, 2 pp. (Applicant points out that, in accordance with MPEP 609.04(a), the 2011 year of publication is sufficiently earlier than the effective U.S. filing date and any foreign priority date of Nov. 4, 2015 so that the particular month of publication is not in issue).

Youtube, "3M Twist 'n Fill Cleaning Chemical Management System", retrieved from hllps:l/www.youtube.com/watch?v=KquJmrV2Jiw, Uploaded on Aug. 30, 2009, 1 pp.

Prosecution History from U.S. Appl. No. 14/932,761, dated Apr. 7, 2017 through Jul. 26, 2017, 22 pp.

International Preliminary Report on Patentability from counterpart International Application No. PCT/US2015/058965, dated May 17, 2018, 7 pp.

\* cited by examiner

REFILLABLE DISPENSING SYSTEMS AND COMPONENTS

CROSS REFERENCE TO RELATED APPLICATIONS

This application is a continuation of U.S. application Ser. No. 14/932,761, filed on Nov. 4, 2015, entitled, "REFILLABLE DISPENSING SYSTEMS AND COMPONENTS," which is incorporated herein by reference in its entirety.

TECHNICAL FIELD

The disclosure relates to fluid dispensing systems and components thereof.

BACKGROUND

Hand washing is important in many industries, including hospitality (hotels, restaurants, etc.) and healthcare (hospitals, nursing homes, etc.). To facilitate hand washing, fluid dispensers that dispense hand cleansing products may be placed near sinks of a kitchen or washroom for the washing of hands by employees or patrons of an establishment, employees, patients, or visitors to a healthcare facility, or other persons. Such fluid dispensers house a disposable or refillable product container, such as a cartridge or flexible bag, containing a supply of the desired fluid product. The fluid may include, for example, foams, liquids, and/or gels. The dispensers are generally wall mounted and include a hinged cover which permits opening and closing of the dispenser housing so that the supply of fluid product may be refilled or replaced. Some fluid dispensers are manually actuated by pushing or pulling a handle, bar, or button on the dispenser. Others dispense automatically by sensing presence of a user or the user's hands near the dispenser.

SUMMARY

In general, the disclosure relates to refillable dispensing systems and components thereof.

In one example, the disclosure is directed to a refillable dispensing system comprising a filling station including a docking connector, the filling station configured to dispense a chemical product solution from a chemical product concentrate, a product package configured to contain a quantity of the chemical product concentrate, and a fitment insert fitted within a neck of the product package, the fitment insert configured to mate with the docking connector and form a sealed connection therewith, the fitment insert further comprising a fitment insert body including a first bore defining a fluid passage from a first side of the fitment insert body to a second side of the fitment insert body, the fitment insert body further including an interior wall forming a circumferential ridge around the interior of the fluid passage, a tubular barb member having a first end and a second end and configured to fit within the fluid passage of the fitment insert body with the first end disposed toward the first side of the fluid passage, the barb member having a second bore extending from the first end to the second end, a check ball seal disposed between the first end of the barb member and the circumferential ridge, and a check ball that is biased to a closed position with respect to the check ball seal within the fluid passage, the check ball further disposed to slide within the second bore between the closed position and an open position, the docking connector further comprising a docking connector body, and a fill probe configured to depress the check ball from the first side of the fitment insert body and move the check ball from the closed position to the open position when the fitment insert is mated with the docking connector.

The fitment insert body may further include a vent bore defining a venting passage from the first side of the fitment insert body to the second side of the fitment insert body, a vent probe seal disposed around an circumferential interior ridge within the venting passage, and a tubular vent probe configured to fit within the venting passage, the vent probe biased to a closed position with respect to the vent probe seal, the vent probe further disposed to slide within the venting passage between the closed position and an open position.

In another example, the disclosure is directed to a fitment insert that forms a sealed port through which a product package may be filled with a fluid chemical product, comprising a fitment insert body including a first bore defining a fluid passage from a first side of the fitment insert body to a second side of the fitment insert body, the fitment insert body further including an interior wall forming a circumferential ridge around the interior of the fluid passage, a tubular barb member having a first end and a second end and configured to fit within the fluid passage of the fitment insert body with the first end disposed toward the first side of the fluid passage, the barb member having a second bore extending from the first end to the second end, a seal disposed between the first end of the barb member and the circumferential ridge, and a check ball that is spring-biased to a closed position with respect to the seal within the fluid passage, the check ball further disposed to slide within the second bore between the closed position and an open position. The fitment insert body may further include a circumferential rim disposed around the first side of the fitment insert body; and a plurality of circumferential fitment tabs disposed around a sidewall of the fitment insert body, the fitment tabs and circumferential rim configured to receive a neck of the product package.

In another example, the disclosure is directed to a refillable product package comprising a fitment insert. The refillable product package may further include a product bottle having a neck, wherein the fitment insert body is fitted within the neck of the product bottle.

In another example, the disclosure is directed to a refillable product package comprising a product package having a one or more sidewalls and a neck, and a fitment insert that forms a sealed port through which a product package may be filled with a fluid chemical product, the fitment insert comprising a fitment insert body configured to sealably fit within the neck of the product package, the fitment insert body including a first bore defining a fluid passage from a first side of the fitment insert body to a second side of the fitment insert body, the fitment insert body further including an interior wall forming a circumferential ridge around the interior of the fluid passage, a tubular barb member having a first end and a second end and configured to fit within the fluid passage of the fitment insert body with the first end disposed toward the first side of the fluid passage, the barb member having a second bore extending from the first end to the second end, a seal disposed between the first end of the barb member and the circumferential ridge, and a check ball that is spring-biased to a closed position with respect to the seal within the fluid passage, the check ball further disposed to slide within the second bore between the closed position and an open position.

The details of one or more examples are set forth in the accompanying drawings and the description below. Other features and advantages will be apparent from the description and drawings, and from the claims.

DETAILED DESCRIPTION

In general, the disclosure is directed to refillable dispensing systems and components thereof. The system may include one or more reusable or refillable product packages configured to dock with an automated refilling station. The automated filling station automatically mixes concentrated chemical product with a diluent and dispenses the resulting chemical product solution. The product package may include a fitment insert configured to mate with a docking connector at the automated refilling station. When the product package is docked with the filling station, cooperation of the docking connector and the fitment insert may allow air to exit the interior of the product package as the chemical product is dispensed into the product package. When chemical product is dispensed from the product package, the fitment insert may further allow air to enter the interior of the product package to prevent collapse of the product package walls. Fitment insert and docking connection may be further configured to eliminate residual product build-up after dispensing of the diluted chemical product solution into product package, thus enabling the product package to achieve a dry break from the filling station. Once removed from the docking connection, the example fitment insert provides a positive, closed seal for the product package that does not leak in any orientation under normal conditions.

Figure 1A:
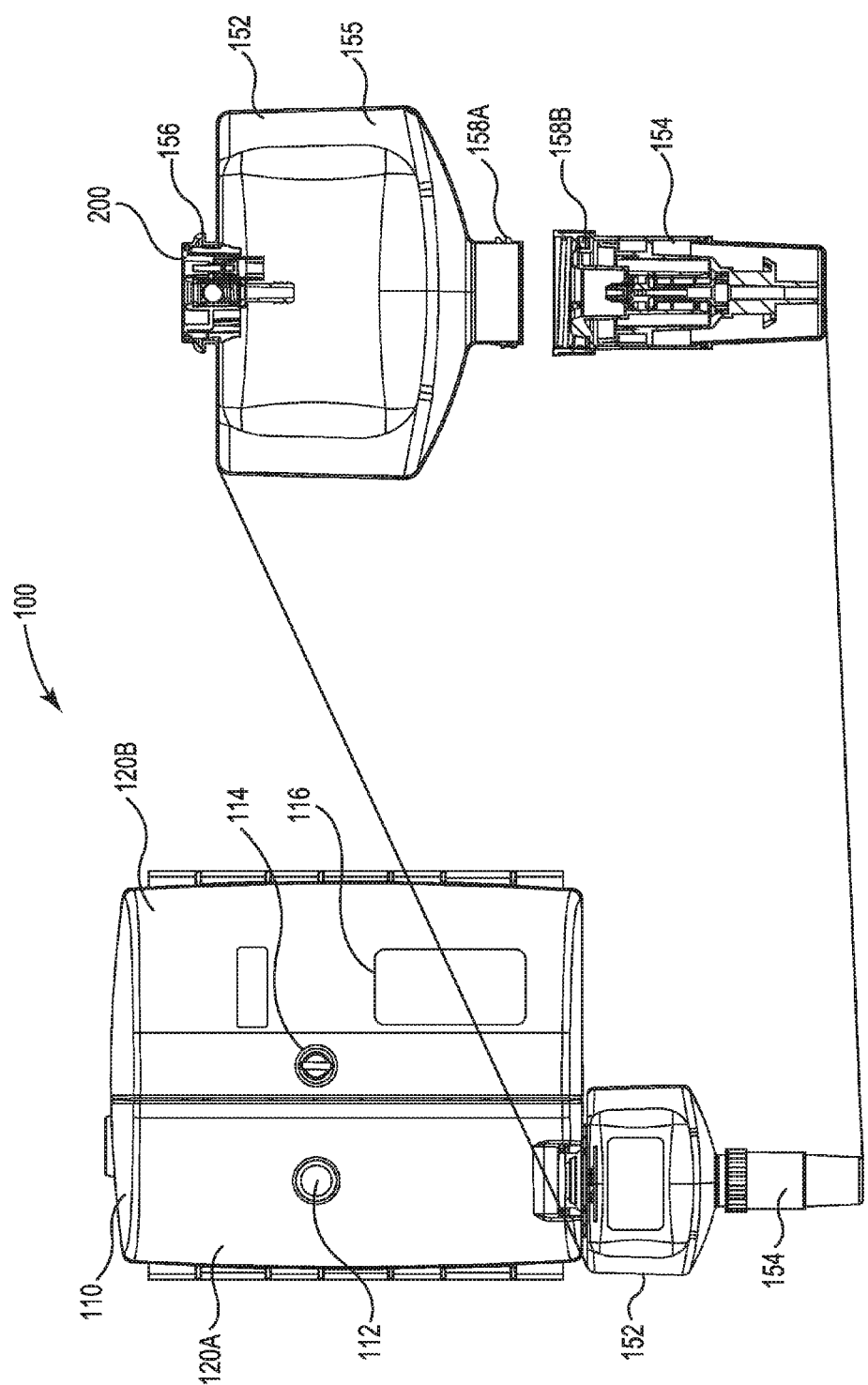
FIG. 1A is a diagram showing an example refillable dispensing system.

FIG. 1A is a shows an example refillable dispensing system 100. Refillable dispensing system 100 includes a filling station 110 and at least one product package 152. In the examples described herein, product package 152 may be reusable or refillable. Filling station 110 automatically mixes concentrated chemical product with a diluent and dispenses the resulting chemical product solution to product package 152. A concentrate container 118 (see FIG. 1B) located within filling station 110 stores the chemical product concentrate. Filling station 110 is further connected to receive the diluent (such as water). A mixing pump within the filling station (not shown) automatically draws an appropriate amount of chemical product concentrate from concentrate container 118 and mixes it with an appropriate amount of diluent to create a chemical product solution having a target concentration. In the case of hand soap concentrates, for example, the dilution ratio may be 5:1 (5 parts diluent to 1 part concentrate) or 10:1. However, it shall be understood that any dilution ratio may be used and that the disclosure is not limited in this respect.

Example refillable dispensing system 100 may be used with any type of concentrated chemical product, including but not limited to hand cleansers, liquid soaps, lotions, gels, foams, shampoos, hand creams, sanitizers, disinfectants, foams, detergents, bleaches, cleaning agents, laundry products, dish washing products, etc. In other examples, system 100 may be used with any other type of chemical product.

Figure 1B:
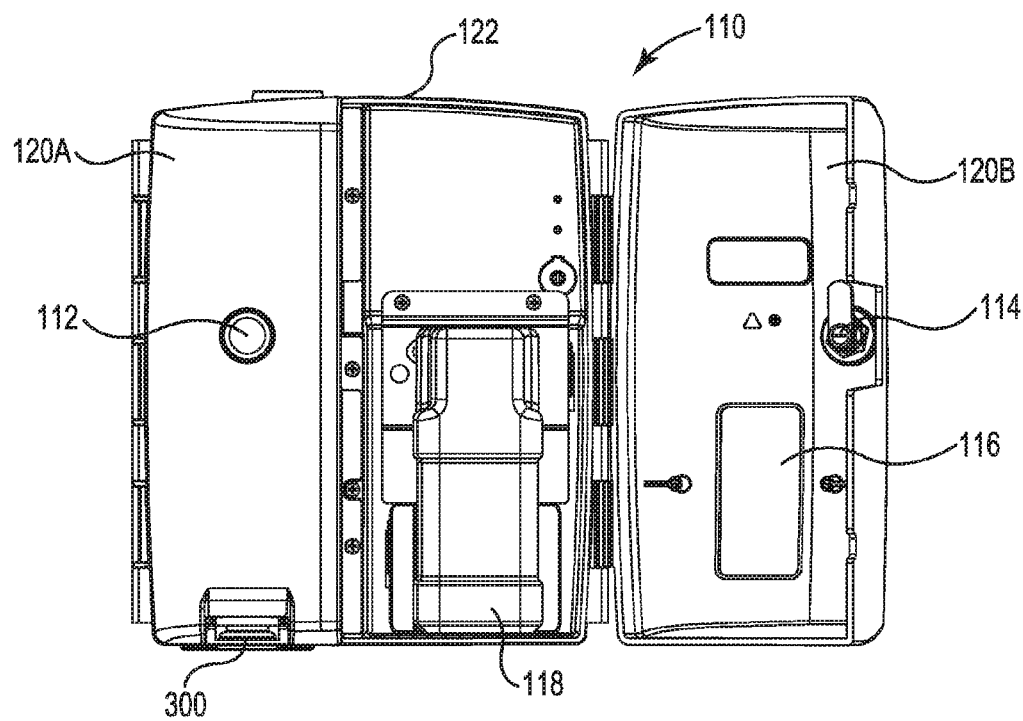
FIG. 1B shows the example filling station housing of FIG. 1A with a door open.
Figure 1C:
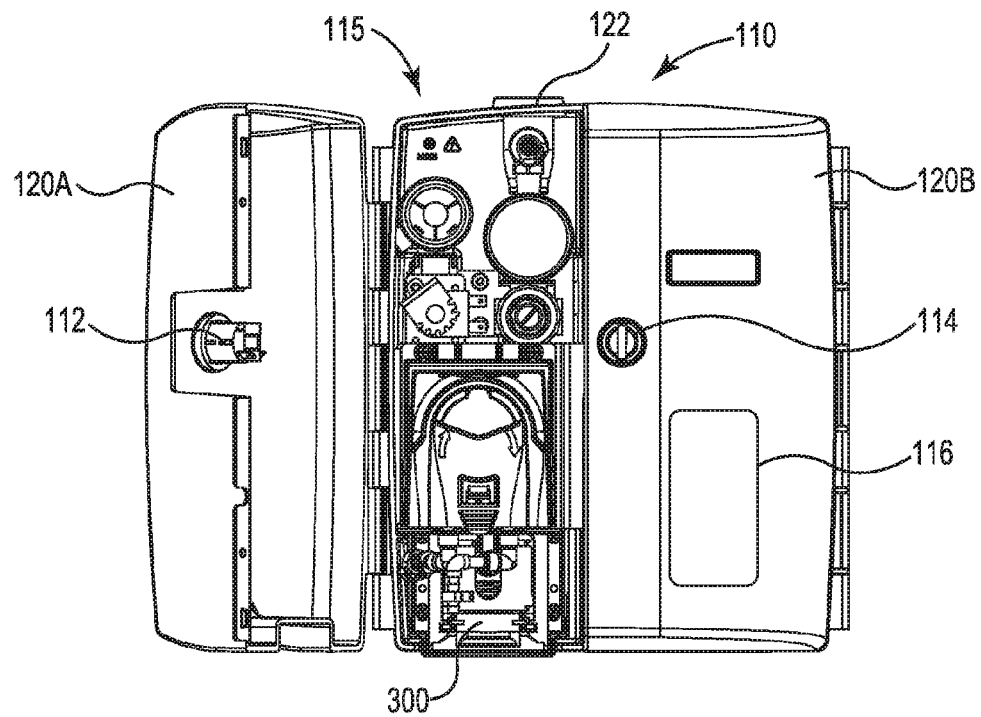
FIG. 1C shows the example filling station housing of FIG. 1A with a different door open.

Filling station 110 includes filling station housing 122, an actuator 112, and doors 120A and 120B. FIG. 1B shows the example filling station housing 122 of FIG. 1A with door 120B open. A window 116 permits a user to view the amount of concentrate remaining in concentrate container 118. A lock 114 permits a user to lock filling station housing 122 so as to ensure only authorized users have access to the interior of the filling station housing and to permit tampering. Opening of door 120B permits access to the interior of the filling station housing 122 so that concentrate container 118 may be replaced when it becomes empty or when dispensation of a different chemical product is desired. FIG. 1C shows the example filling station housing of FIG. 1A with door 120A open. Opening of door 120A permits access to the interior of filling station housing 122 and access to an automated filling pump 115 and docking connector 300. When the fitment insert of a product package is mated to docking connector 300, actuation of actuator 112 causes automated filling pump 115 to automatically mix concentrated chemical product stored in concentrate container 118 with a diluent and dispenses the resulting chemical product solution into the product package through the fill port defined by the product package fitment insert.

Referring again to FIG. 1A, example product package 152 includes one or more sidewalls 155 forming an enclosed product package configured to contain a quantity of chemical product. Product package 152 further includes an input port defined by a neck 156 through which product package may be filled with chemical product and an output port 158A through which chemical product may be dispensed from the product package. A fitment insert 200 fitted within the neck 156 of product package 152 is configured to form a sealed connection with a docking connector (see, e.g., FIG. 3) located within the filling station housing 122. Fitment insert 200 forms a fill port through which product package 152 may be refilled. Once removed from the docking connection, fitment insert 200 provides a positive seal for product package 152 that does not leak in any orientation under normal conditions. Fitment insert 200 and docking connection may be further configured to eliminate residual product build-up after dispensing of the solution into product package 152, thus enabling the product package 152 to achieve a dry break from the filling station after filling of the product package is completed.

Figure 2B:
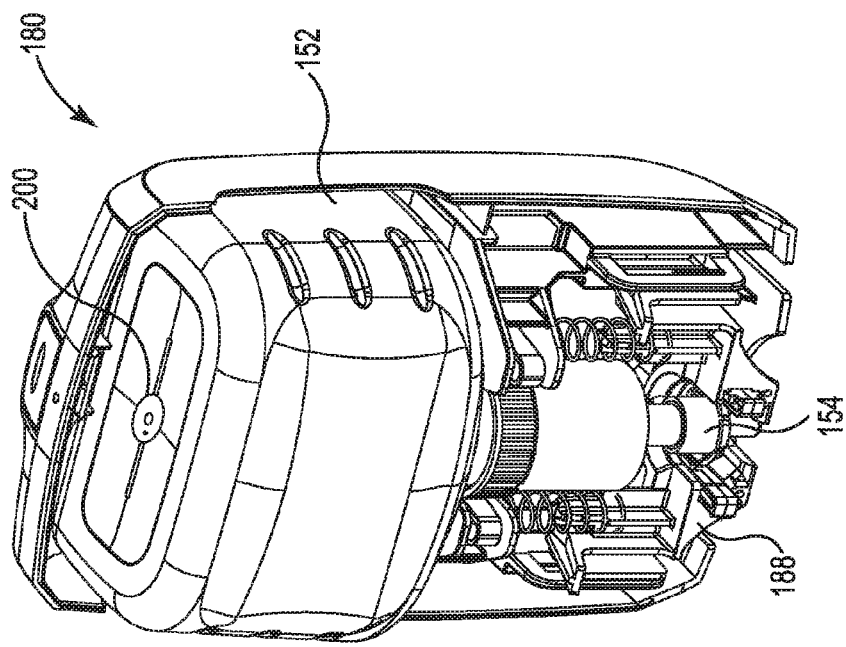
FIGS. 2A and 2B shows an example dispenser which may be used to dispense chemical product from a product package such as that shown in FIG. 1A.
Figure 2A:
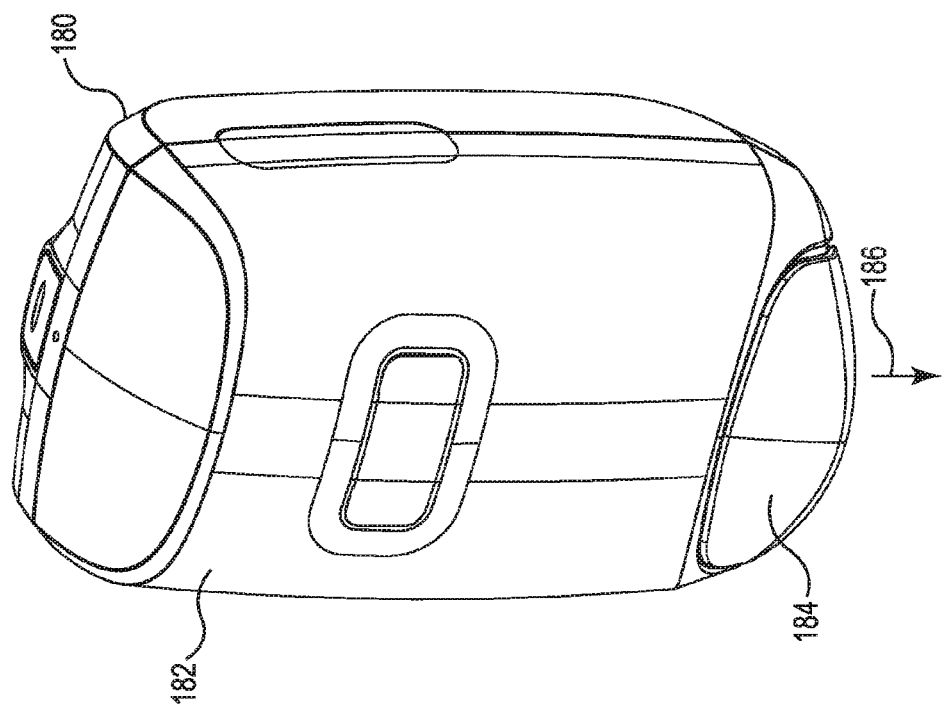

Product package 152 may be further connected to a pump 154 to permit the chemical product to be dispensed from product package 152. In the example of FIG. 1A, product package 152 and pump 154 are connected by virtue of mating threads 158A and 158B on product package 152 and pump 154, respectively. Product package 152 and pump 154 may in turn be loaded into a product dispenser, such as product dispenser 180 as shown in FIGS. 2A and 2B. Pump 154 may be configured to deliver any form of chemical product, for example, liquids, foams, gels, alcohol foams, etc. In some examples, the combination of pump 154 and product package 152 may provide up to 99% product evacuation of the product package 152 for a wide range of product viscosities and densities.

FIGS. 2A and 2B show an example dispenser 180 which may be used to dispense chemical product from a product package, such as product package 152. As shown in FIG. 2A, dispenser 180 includes a dispenser cover 182 and a push bar 184. FIG. 2B shows example dispenser 180 with the cover 182 and push bar 184 removed. Push bar 184, when actuated by a user, causes a dispense mechanism 188 to engage with pump 154 to result in dispensation of a discrete quantity of the chemical product as indicated by arrow 186. In other examples, a different type of manual actuator may be used in place of push bar 184. Alternatively, dispenser 180 may include a sensor that detects presence of a user's hands near the dispenser and automatically triggers an actuator to dispense a quantity of fluid in response to the detection.

Hand care dispensers, such as example dispenser 180, are generally placed near sinks in kitchens, hospital rooms, restrooms, or other locations to facilitate hand washing by employees, members of the public, or other users. Depending upon the environment in which the dispenser is being used (e.g., a hospitality or restaurant location as opposed to a health care location), the type of fluid being dispensed, and/or the particular requirements of the organization or corporate entity, the desired amount of fluid product to be dispensed may differ. In some examples, pump 154 and/or dispenser 180 may be implemented as shown and described in U.S. Pat. No. 8,851,331 to Pelkey et al., issued Oct. 7, 2014, and U.S. Pat. No. 8,991,655 to Pelkey, issued Mar. 31, 2015, both of which are incorporated herein by reference in their entirety. However, it shall be understood that other pump and/or dispenser designs may also be used, and that the disclosure is not limited in this respect.

The combination of refill station 110, product package 152, fitment insert 200, and pump 154 results in a "closed-loop" refillable dispensing system in the sense there is no user contact with concentrated chemicals. The refilling station automatically provides the correct dilution ratio of the concentrated chemical product, and the sealed connection of the fitment insert and the docking connector greatly reduces, if not eliminates, worker exposure to harsh chemicals. Refillable dispensing system 100 may thus increase ease of use, worker safety, and accuracy in the preparation of diluted chemical solutions.

Figure 3A:
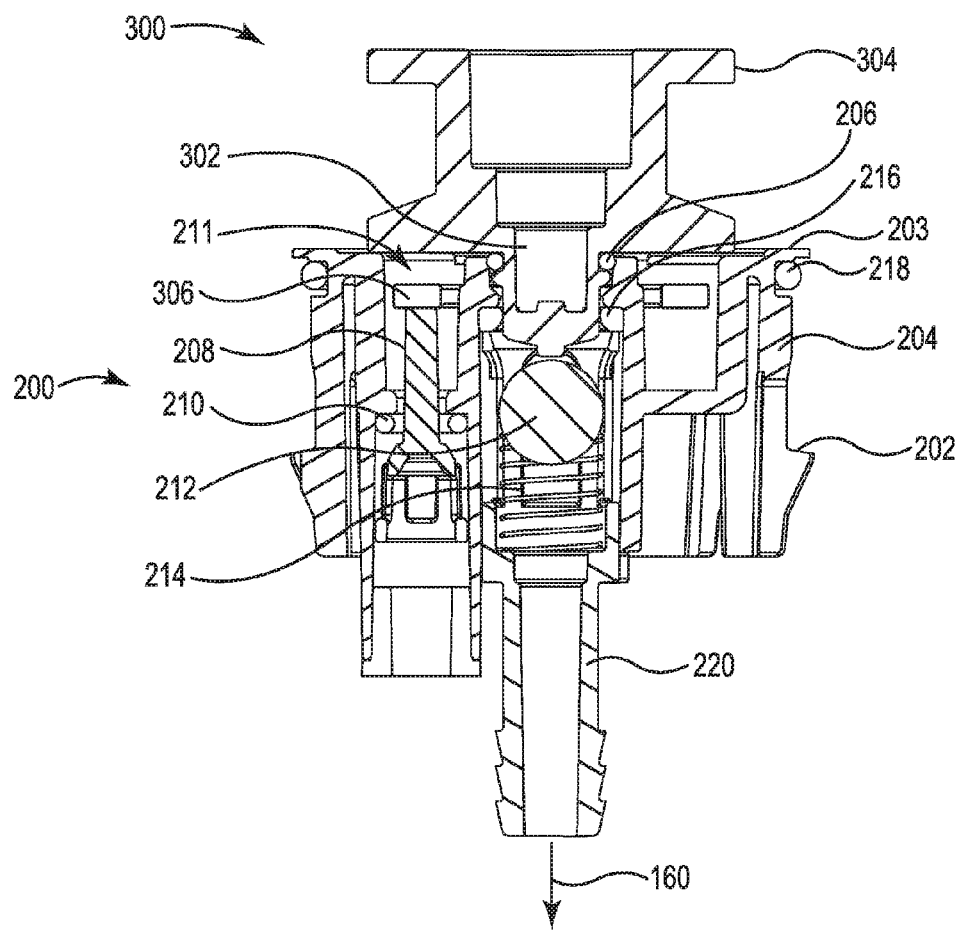
FIG. 3A is a cross-sectional diagram of an example fitment insert mated with a docking connector, and showing the check ball in the open position.

FIG. 3A is a cross-sectional diagram of an example fitment insert 200 mated with an example docking connector 300, and showing a check ball 212 in the open position with respect to a check ball sealing ring 216. Docking connector 300 may form the receiving connector of a filling station, such as filling station 110 as shown in FIG. 1. Docking connector 300 includes a docking connector body 304, a fill probe 302, and a vent tab 306. Fitment insert 200 includes a fitment insert body 204 including a first bore 209 defining a fluid passage from a first side 201 of the fitment insert body to a second side 203 of the fitment insert body, the fitment insert body further including an interior wall 205 forming a circumferential ridge 223 around the interior of the fluid passage.

Fitment insert body also includes a barb member 220, check ball 212, a spring 214, and a vent probe 208. Fitment insert body 204 further includes a plurality of fitment tabs 202 and a rim 203. Fitment insert body 200 further includes a docking seal 206, a ball seal 216 a vent probe seal 210 and a fitment rim seal 218. Barb member 220 is generally tubular in shape, includes a first end and a second end, and is configured to fit within the fluid passage of the fitment insert body 204 with the first end disposed toward the first side of the fluid passage, the barb member also includes a bore extending from the first end to the second end.

When inserted into a product package, such as product package 152 of FIG. 1, fitment insert body receives the neck 156 of product package 152 between rim 203 and fitment tabs 202. Fitment tabs 202 flex inwardly during insertion of fitment insert body 204 into the neck 156 of product package 152 and then release back once the neck 156 of product package 152 is fully received within the space defined by rim 203 and fitment tabs 202. Force exerted by fitment tabs 202 presses neck 156 of product package 152 against fitment rim sealing ring 218 to provide a seal between the fitment insert body 204 and neck 156 of product package 152.

Fitment insert body 200 and docking connector 300 cooperate to provide a closed-loop system in which chemical product may be delivered from, for example, refill station 110, to a product package such as product package 152 without exposing a user to harsh chemical concentrates. When fully docked, fill probe 302 of docking connector body 304 depresses check ball 212, allowing for product to flow into the product package as indicated by arrow 160. While the product package is docked, tabs 306 of docking connector body 304 depress vent probe 208 to allow entrapped air to leave the product package through a venting aperture 211. A docking seal 206 prevents product from leaking out between fitment insert body 204 and docking connector body 304. Fill probe 302 is configured to depress check ball 212 from the first side 201 of the fitment insert body and move check ball 212 from the closed position with respect to seal 216 to the open position with respect to seal 216 when fitment insert 200 is mated with docking connector 300.

In some examples, once the package is removed from docking connector 300, check ball 212 is biased to closed position with respect to the check ball seal 216. In the example of FIG. 3A, the biasing force is provided by spring 214 pushes check ball against ball sealing ring 216 (or simply check ball seal 216), forming a positive, leak-proof seal. However, it shall be understood that other mechanisms for biasing the check ball may also be used, and that the disclosure is not limited in this respect. A user may carry, transport, or store the product package in any orientation without product leaving the package. To dispense the product, the user need not to open the container as it is a closed-loop system. The contents of the product package are dispensed/evacuated during normal use within the respective dispenser unit.

Figure 3B:
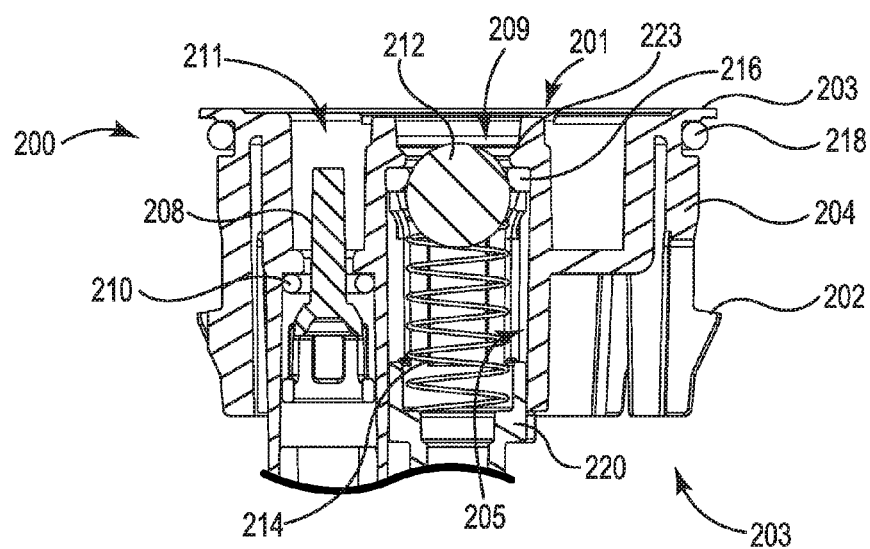
FIG. 3B is a cross-sectional diagram of an example fitment insert showing the check ball in the closed position.

FIG. 3B is a cross-sectional diagram of an example fitment insert 200 showing the check ball 212 in the closed position with respect to a check ball sealing ring 216. Sealing ring 216 is seated in a groove defined by a top edge of barb 220 and an inside edge ridge formed by fitment insert body 204. When fitment insert 200 is not mated to docking connector 300, a force provided by spring 214 pushes check ball 212 upwardly and against sealing ring 216, creating a seal at the interface of the check ball 212 and sealing ring 216.

Figure 3C:
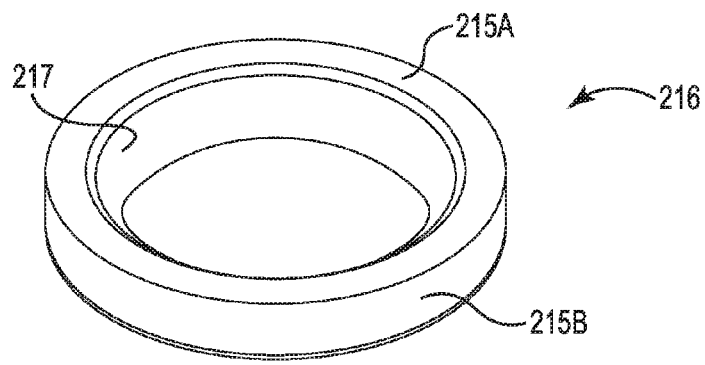
FIG. 3C is a perspective view of an example check ball sealing ring.
Figure 3D:
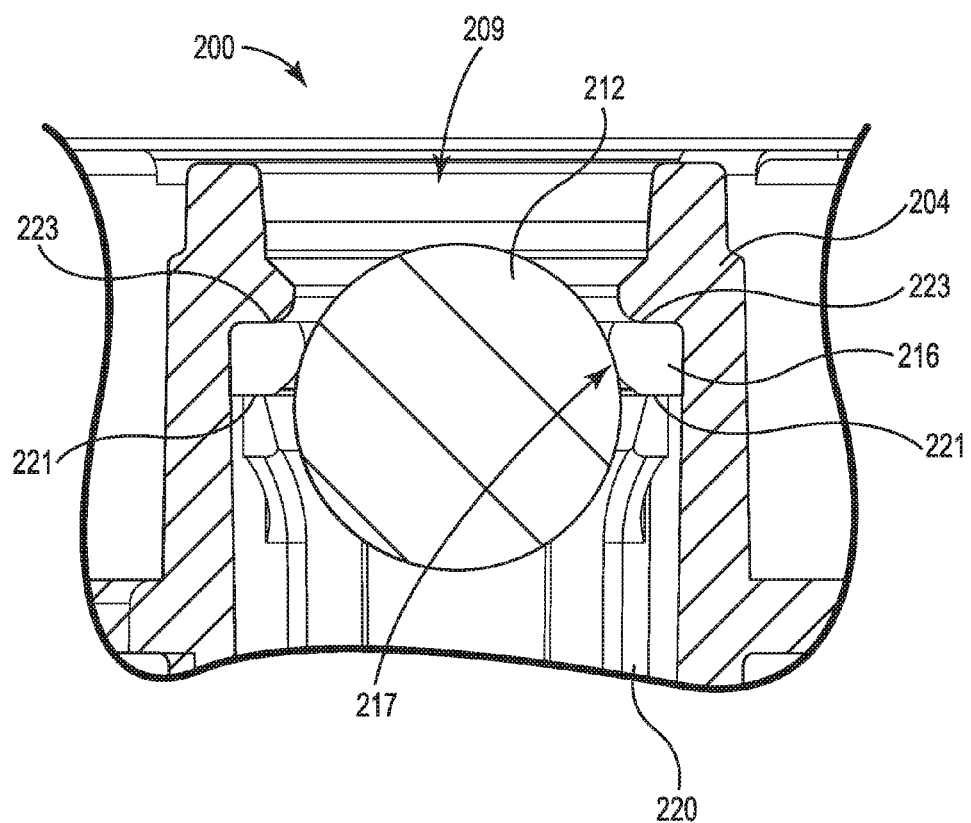
FIG. 3D is a magnified cross-sectional diagram of an example fitment insert showing the check ball in the closed position.

FIG. 3C is a perspective view of an example check ball sealing ring 216, and FIG. 3D is a magnified cross-sectional diagram of an example fitment insert 200 showing check ball 212 in the closed position with respect to the check ball sealing ring 216. Example sealing ring 216 is generally in the shape of a torus having a non-circular cross-section. Sealing ring may be fabricated using, for example, an elastomeric material. Sealing ring 216 has a non-circular cross-section including a flattened sealing surface 217, and fitment sealing surfaces 215A and 215B. Fitment sealing surfaces 215A and 215B are shaped to fit the geometry of an interior ridge 223 formed within longitudinal bore 209 of fitment insert body 204. In this way, sealing surface 217 of sealing ring 216 presented to check ball 212 in the closed position presents a relatively greater surface area for the sealing interface as compared to a sealing ring having a circular cross-section.

Sealing ring 216 is seated in a groove defined by a top edge 221 of barb 220 and a lower surface of interior ridge 223 formed within a longitudinal bore 209 through fitment insert body 204. The longitudinal axis of the bore 209 of fitment insert body is generally aligned (e.g., co-linear) with the longitudinal bore 226 of barb 220 (see, e.g., FIG. 5B) when barb 220 is received within bore 209. When fitment insert 200 is not mated to docking connector 300, the force provided by spring 214 pushes check ball 212 upwardly and against sealing ring 216, creating a seal at the interface of the check ball 212 and the sealing ring 216. Again, due to the flattened sealing surface 217 of sealing ring 216, a relatively greater surface area is provided for the sealing interface between sealing ring 216 and check ball 212 as compared to a sealing ring having a circular cross-section.

Figure 4:
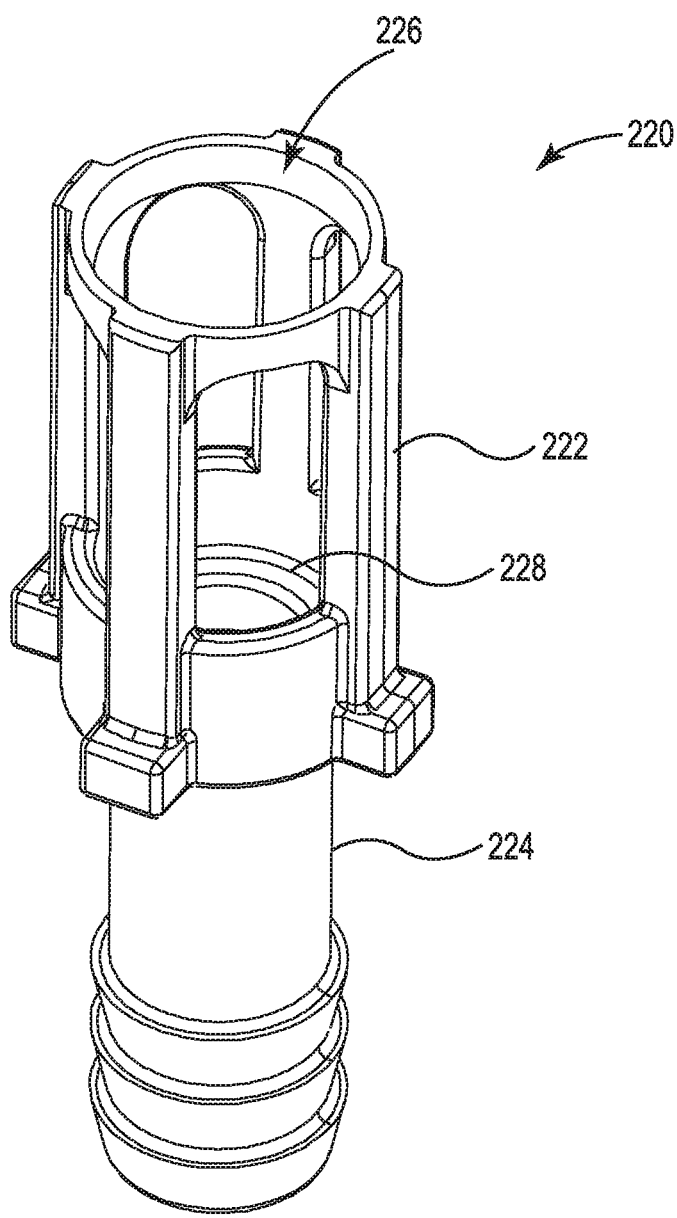
FIG. 4 is a perspective view of a fitment insert barb.
Figure 5A:
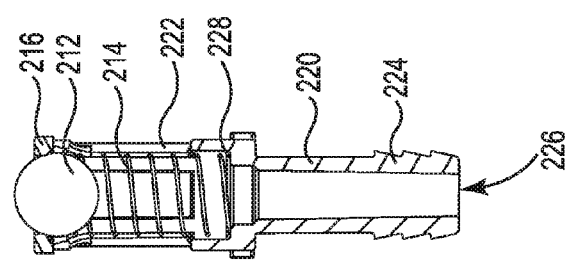
FIG. 5A is an exploded view of an example barb, spring, ball and ball seal of an example fitment insert.
Figure 5B:
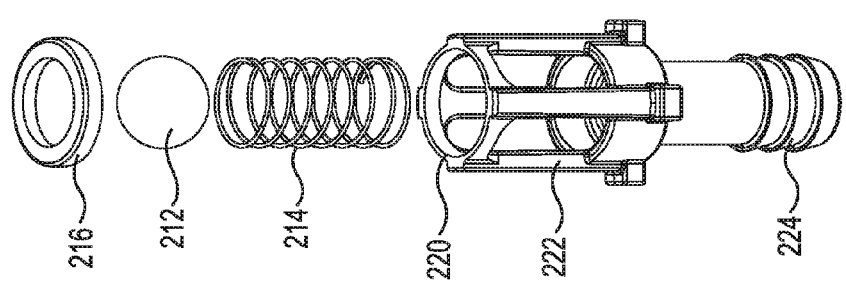
FIG. 5B is a diagram showing of an example barb, spring, ball, and ball seal as they would be assembled within an example fitment insert.

FIG. 4 is a perspective view of a fitment insert barb 220. Barb 220 is sized to fit within fitment insert body 204. Barb 220 includes one or more guide rails 222, a barb tip 224, a longitudinal bore 226 and a spring seat 228. FIG. 5A is an exploded view of an example barb 220, spring 214, ball 212, and ball seal 216 of an example fitment insert 300. FIG. 5B is a cross-sectional view showing an example barb 220, spring 214, ball 212, and ball seal 216 as they would be assembled within an example fitment insert 300. Guide rails 222 are sized to guide movement of check ball 212 from a sealed position to an open position. An inner rim formed around the circumference of bore 226 forms a spring seat 228 that supports spring 214 within bore 226.

Figure 6C:
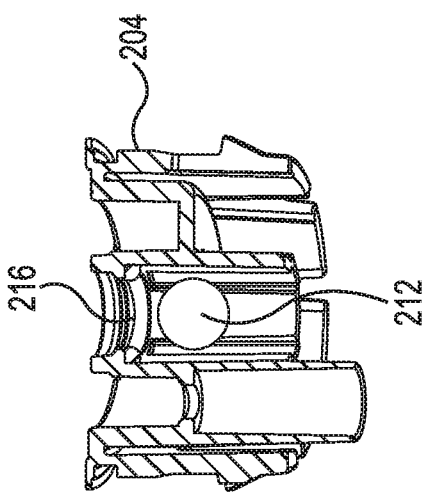
FIGS. 6A-6C are cross-sectional diagrams illustrating an example fitment insert in a closed position, an open position, and a vacuum relief position, respectively.
Figure 6B:
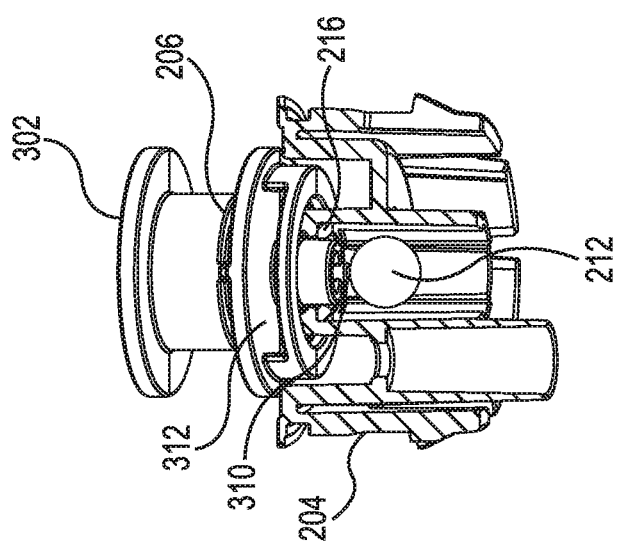
Figure 6A:
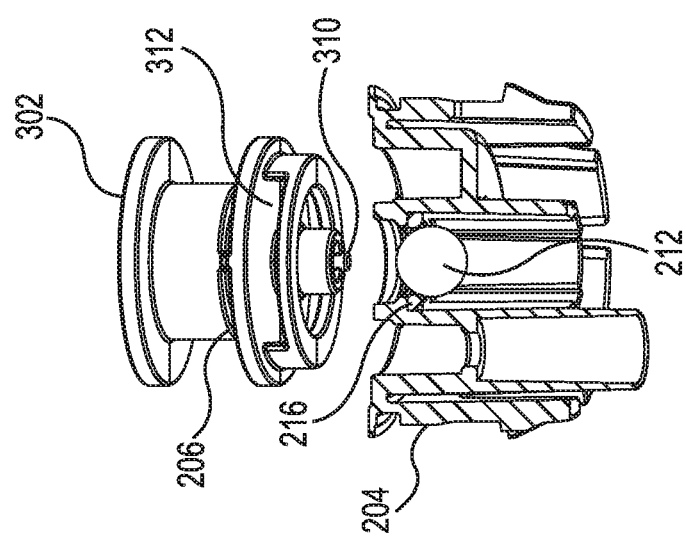

FIGS. 6A-6C are cross-sectional diagrams illustrating a fitment insert in a closed position, an open position, and a vacuum relief position, respectively. In the closed position as shown in FIG. 6A, check ball 212 is held against ball seal 216 by the spring force provided by spring 214 (not shown in FIG. 6A for purposes of illustration). Once fitment insert body 204 is fully docked with docking connector body 304, fill probe 302 depresses check ball 212, causing it to move from the closed position shown in FIG. 6A to the open position as shown in FIG. 6B. In the open position, fluid is dispensed through the tip of fill probe 302, around check ball 212 and into the product package.

Once the product package is removed from the filling station, and thus the fitment insert body 204 is removed from the docking connector body 304, tension provided by spring 214 (not shown in FIGS. 6A-6C) pushes check ball 212 against ball seal 216, forming a tightly closure and preventing chemical product from leaving the product package through the fill port provided by the fitment insert 300. Product package may then be loaded into a chemical product dispenser, such as example dispenser 180 as shown in FIGS. 2A and 2B. When product is subsequently dispensed from the product package, such as by manual actuation of a push bar or automatic actuation by a motion or presence sensor, a partial vacuum within the product package is created due to the seal provided by the check ball 212 and seal 216 of fitment insert body 302. In some examples, however, the spring tension of spring 214 is designed to maintain equilibrium of the product package pressure during product dispense. For example, the spring tension may be such that the partial vacuum resulting from dispensation of the chemical product from the product package draws ball 212 away from the ball seal 216 enough to allow air to enter and prevent collapse of the product package, as shown in FIG. 6C.

In some examples, the tip of fill probe 302 may include a protruding rib 310 that depresses check ball 212 and separates check ball 212 from apertures 312 in the fill probe 302 from which chemical product solution is dispensed, as shown in FIGS. 6A-6C. The filling operation takes place below the sealing surface of the fitment insert (that is, below fitment-to-product package seal 216 and docking seal 206) so that residual build-up of product is mitigated. This may help to achieve a clean separation from docking connector 300 and fitment insert 200.

Figure 7:
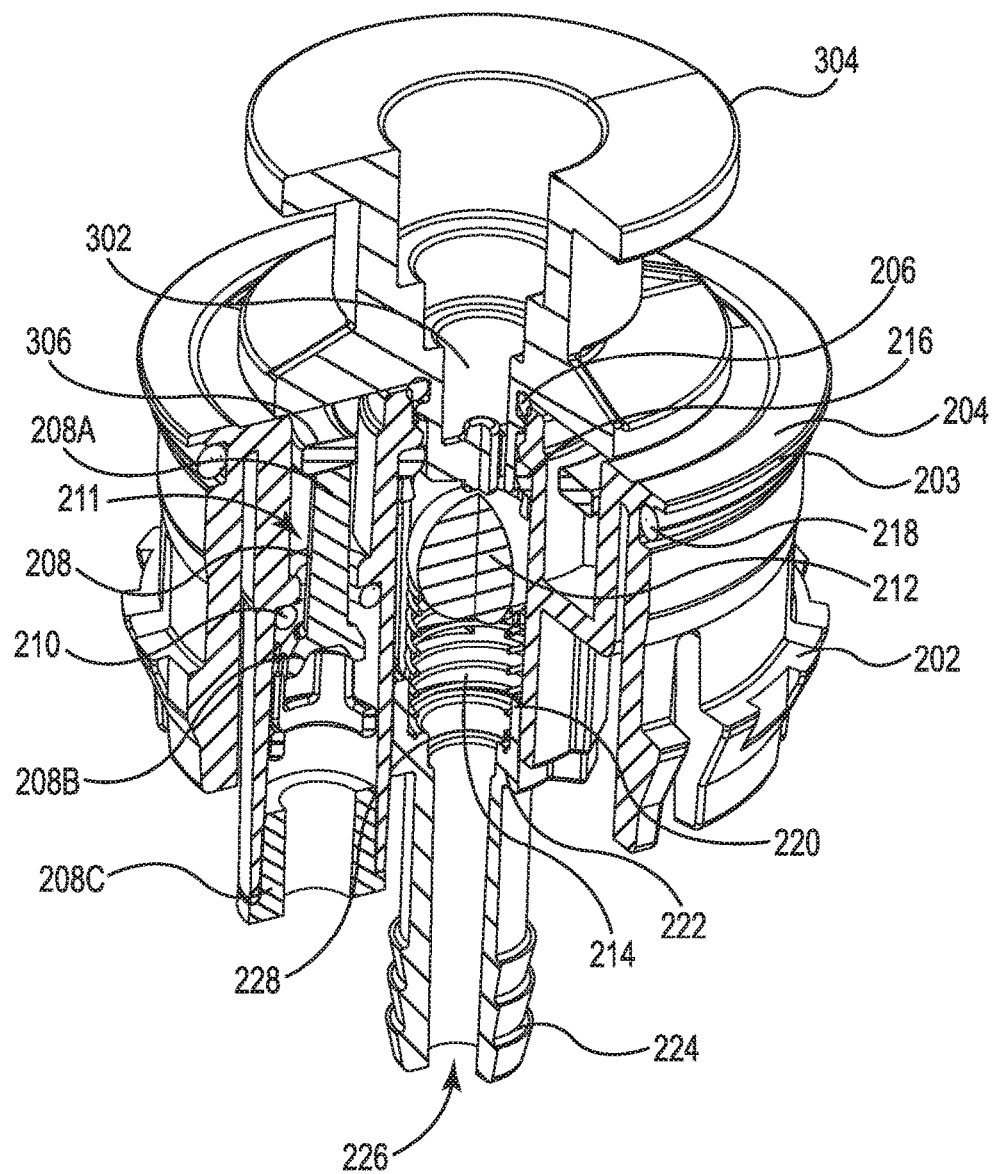
FIGS. 7 and 8 are top perspective and bottom perspective views, respectively, of an example fitment insert body docked with an example docking connector.
Figure 8:
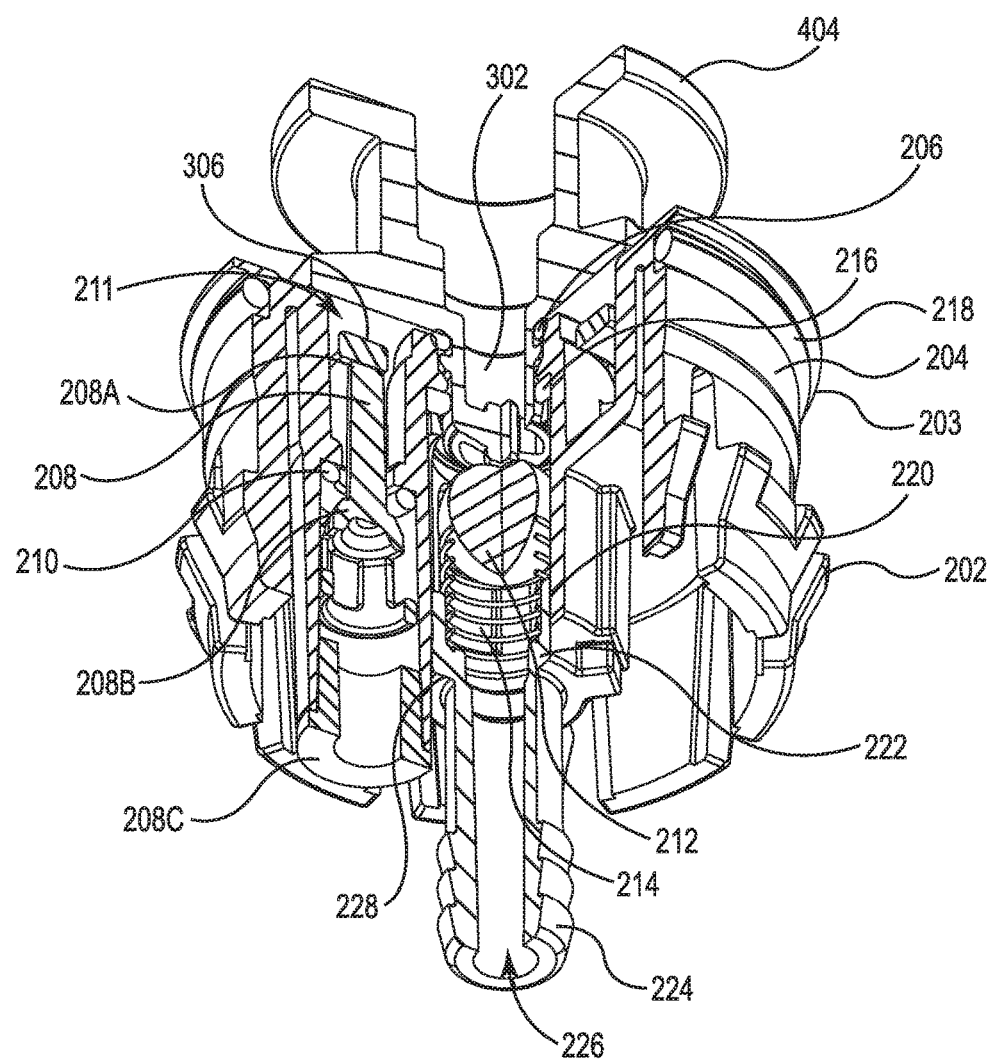

FIGS. 7 and 8 are top perspective and bottom perspective views, respectively, of a fitment insert 200 mated with a docking connector 300. As shown above with respect to FIG. 4, docking connector 300 may form the receiving connector of a filling station, such as filling station 110 as shown in FIG. 1. Docking connector 300 includes docking connector body 304, fill probe 302, and vent tab 306. Fitment insert 200 includes fitment insert body 204, barb 220, check ball 212, spring 214, and vent probe 208. Fitment insert body 204 further includes a plurality of fitment tabs 202 and rim 203. Fitment insert body 200 further includes docking seal 206, ball seal 216, vent probe seal 210 and fitment rim seal 218.

When inserted into a product package, such as product package 152 of FIG. 1, fitment insert body receives the neck 156 of product package 152 between rim 203 and fitment tabs 202. Fitment tabs 202 flex inwardly during insertion of fitment insert body 204 into neck 156 of product package 152 and release back once the neck 156 of product package 152 is fully received within the space defined by rim 203 and fitment tabs 202. Force exerted by fitment tabs 202 presses neck 156 of product package 152 against fitment rim sealing ring 218 to provide a seal between the fitment insert body 204 and neck 156 of product package 152.

Fitment insert body 200 and docking connector 300 cooperate to provide a closed-loop system in which chemical product may be delivered from, for example, refill station 110, to a product package such as product package 152 without exposing a user to harsh chemical concentrates. When fully docked, fill probe 302 of docking connector body 304 depresses check ball 212, allowing for product to flow into the product package as indicated by arrow 160. A longitudinal bore 226 extending through barb 220 receives check ball 212. A spring 214 fits within bore 226 and is supported by spring seat 214. Check ball 212 moves within guide rails 222 between a closed position (not docked) and an open (docked) position. Movement of the check ball 212 is resisted by spring 214. Spring 214 is supported by spring seat 228 formed at the base of guide rails 222 around an inner circumference of barb 220.

Guide rails 222 maintain proper alignment of check ball 212, helping to prevent misalignment of the check ball 212 with respect to the seal 216. The top edge of barb 220 maintains constant positioning of ball seal 216 and helps prevent ball seal 216 from becoming dislodged.

Check ball 212 moves in a linear path along guide rails 222 depending on the forces acting on it. Once seated, spring 214 creates a positive seal between check ball 212 and O-ring seal 216 until sufficient cracking pressure (provided by dispensation of the chemical product from the product package) breaks the seal.

While the product package is docked, tabs 306 of docking connector body 304 depress vent probe tip 208A, causing vent probe 208 to move downwardly (as shown in FIGS. 7 and 8) This movement of vent probe 208 further results in vent probe shoulder 208B to move away from vent probe seal 210, thus allowing entrapped air to leave the product package while the product package is being filled. Docking seal 206 prevents the chemical product from leaking out between fitment insert body 204 and docking connector body 304.

Once the product package (and thus the fitment insert body 204) is removed from docking connector 300, force provided by spring 214 pushes check ball against ball seal 216, forming a positive, leak-proof seal. A user may carry, transport, or store the product package in any orientation without leakage of the chemical product.

Although specific example mechanisms to achieve the filling and venting functions, alternative methods may also be used, and the disclosure is not limited in this respect. For example, these functions may be accomplished using a combination valve, a duckbill valve, magnetic valves, a vented membrane, an EPDM ball, an umbrella valve, etc.

Figure 9:
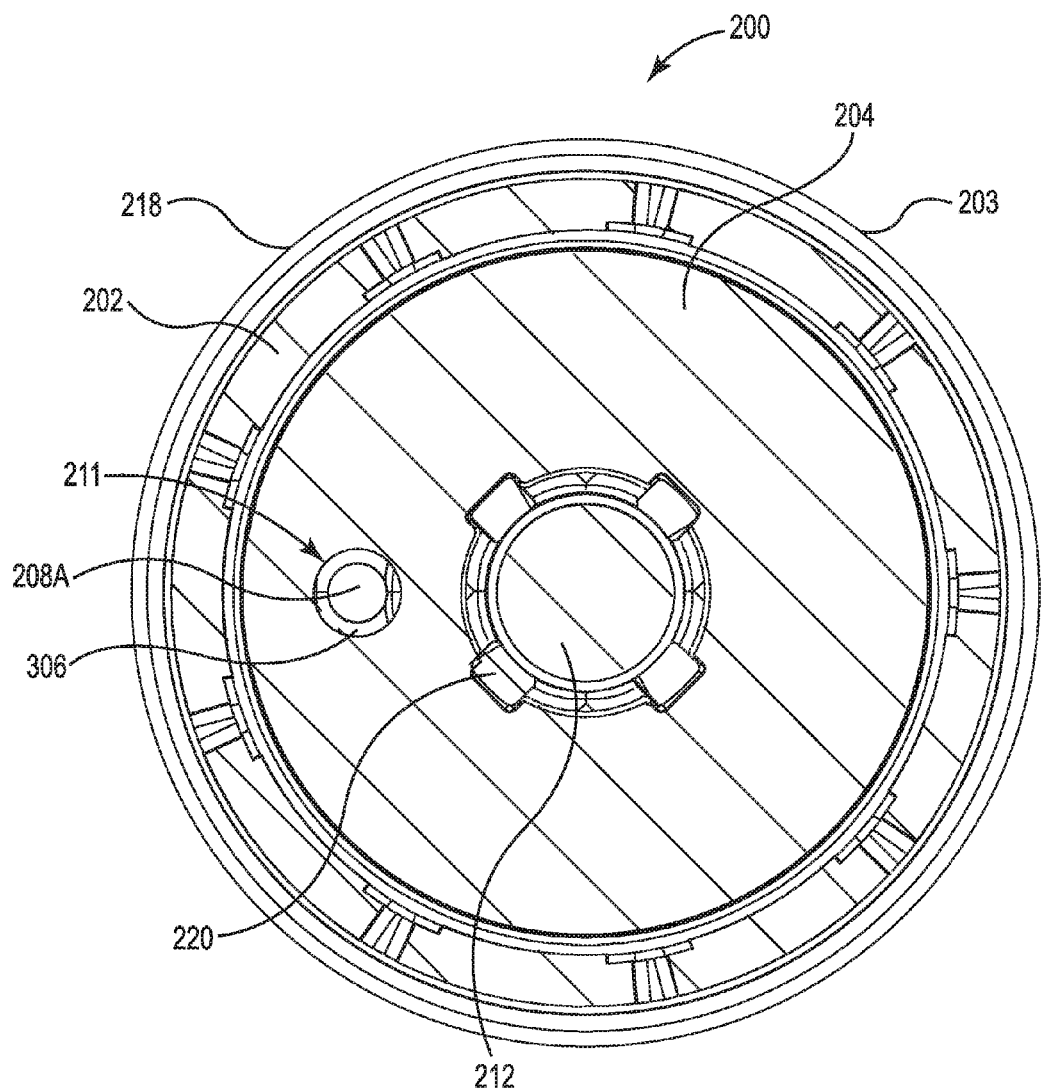
FIG. 9 is a top view of an example fitment insert.

FIG. 9 is a top view of an example fitment insert 200. Visible in FIG. 9 are fitment insert body 204, rim 203, fitment seal 218, vent probe tip 208A, vent tab 306 (visible through aperture 211 in the top of fitment insert body 304), ball 212, and barb 220.

Figure 10:
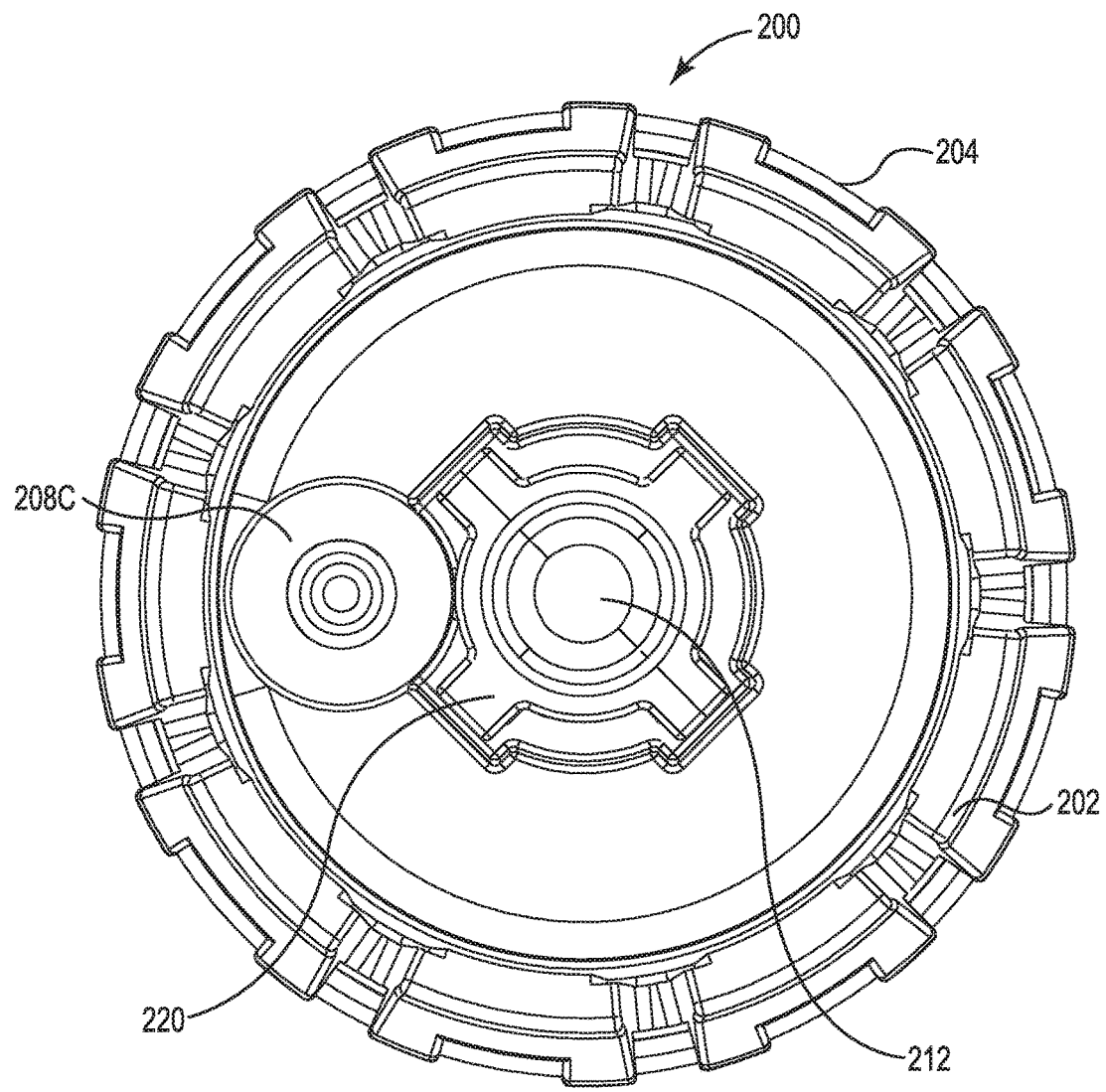
FIG. 10 is a bottom view of an example fitment insert.

FIG. 10 is a bottom view of an example fitment insert 200. Visible in FIG. 10 are fitment insert body 204, locking tabs 202, vent probe base 208C, ball 212 and barb 220.

Product package 152 may be of any appropriate size to fit a variety of dispensing applications. For hand washing applications, for example, product package 152 may be offered in multiple sizes, such as 1250 ml (70 gram), 750 ml (40 gram), and/or any other appropriately sized bottles. In some examples, product package 152 is comprised of a lightweight 100% recyclable High Density Polyethylene (HDPE). For example, the product package may be formed utilizing a high density polyethylene resin with a density greater than 0.953 g/cc (per ASTM D1505). In some applications, the product package may incorporate a percentage (e.g., 25%) of reclaimed post-consumer resin (PCR). The product package design may be aimed at keeping a small footprint while maximizing fill volume. This may be accomplished by designing a low profile top finish and using the inner finish edge as a mechanism to affix the insert permanently via lock tabs. The product package, fitment insert and docking connection may be designed with tight tolerances and quality finish to help ensure that the system remains leak proof.

In some examples, the geometry and features of the product package may be designed to resist or prevent collapse during the evacuation of product. For example, chamfered corners may help control product package deformation and promote a better drop-impact resistance. In some examples, the cracking pressure of the check ball seal may be designed to break before the lightweight HDPE product package collapses.

In the example such as product package 152 as shown in FIG. 1A, the threaded connectors 158A may be designed with a unique thread pitch to help ensure that the proper pump type having the matching thread pitch is mated with the product package.

Check ball sealing ring 216, as well as docking seal 206, fitment seal 218, and vent probe seals, may comprise an elastomeric material, such as EPDM rubber (ethylene propylene diene monomer (M-class) rubber). In some examples, the geometry of check ball sealing ring 216 is such that a flattened sealing surface is presented to the check ball 212, providing a relatively larger surface area for the sealing surface as compared to a sealing ring having a circular cross-section.

Check ball 212 may be either stainless steel (or other hard non-porous material) or may be elastomeric.

Spring 214 may be either metal or plastic. For example, the spring may be 300 series stainless steel or Hastelloy metal blends. The spring length may be optimized to provide the most leak-proof seal while still allowing the partial vacuum to break the seal, thus allowing air to enter into the product package during dispensation of the chemical product and preventing collapse of the product package. In some examples, the spring free length measures approximately 18 mm. However, it shall be understood that the spring parameters may vary depending upon the particular application, and that the disclosure is not limited in this respect.

In some examples, factors that may be taken into account when choosing a spring and/or spring rate may include: the force required to depress check ball 212 should not be too high so as to facilitate ease of docking to a filling station and thus ease-of-filling; the spring should provide sufficient force to the check ball to provide a positive, leak-proof seal when in the closed position; the partial vacuum resulting from dispensation of the chemical product from the product package should be sufficient to overcome o break the spring force and draw the check ball away from the seal, thus allowing the fitment insert to equilibrate the product package. Allowing air back into the product package system may help to prevent the product package from collapsing when used with a non-vented product pump.

The example refillable dispensing system and the components described herein may provide several advantages. For example, the refillable dispensing system may help to reduce costs associated with chemical product dispensing. For example, concentrated formulations may provide enough product for multiple refills using concentrated packs. Users may purchase a set of refillable product packages, and refill and reuse the same set for a longer period of time as compared to 1-time use containers. Concentrated formula may help to reduce storage space, which is a commodity in the janitorial rooms, closets, or carts. Concentrated formula may also help to reduce shipping costs, shipping frequency, packaging costs, and waste pick-up. For example, if a product package may be refilled and reused approximately 10 times, use of a refillable product package may reduce waste by up to 90% compared to 1-time use containers. Flexible product packages may be lighter than rigid hand care bottles. In some examples, the product package may comprise 100% recyclable material, and may last up to 1-year with heavy usage. In addition, users may "top off" a product package whenever it is convenient. This enables users to prepare for busy periods when they don't have the luxury of time to change out product packages. In some examples, cooperation of the pump design and the bottle may result in over 99% evacuation from the product package. This may result in providing more product to the users and less product to landfills.

Example 1

A refillable dispensing system comprising a filling station including a docking connector, the filling station configured to dispense a chemical product solution from a chemical product concentrate, a product package configured to contain a quantity of the chemical product concentrate, and a fitment insert fitted within a neck of the product package, the fitment insert configured to mate with the docking connector and form a sealed connection therewith, the fitment insert further comprising a fitment insert body including a first bore defining a fluid passage from a first side of the fitment insert body to a second side of the fitment insert body, the fitment insert body further including an interior wall forming a circumferential ridge around the interior of the fluid passage, a tubular barb member having a first end and a second end and configured to fit within the fluid passage of the fitment insert body with the first end disposed toward the first side of the fluid passage, the barb member having a second bore extending from the first end to the second end, a check ball seal disposed between the first end of the barb member and the circumferential ridge, and a check ball that is biased to a closed position with respect to the check ball seal within the fluid passage, the check ball further disposed to slide within the second bore between the closed position and an open position, the docking connector further comprising a docking connector body, and a fill probe configured to depress the check ball from the first side of the fitment insert body and move the check ball from the closed position to the open position when the fitment insert is mated with the docking connector.

Example 2

The refillable dispensing system of Example 1 wherein the product package further includes an output port, and the dispensing system further comprises a pump mated to the output port of the product package.

Example 3

The refillable dispensing system of Example 2 further comprising a dispenser configured to receive the product package and the pump, the dispenser further including a dispenser actuator that causes a discrete quantity of chemical product to be dispensed from the product package.

Example 4

The refillable dispensing system of Example 1, wherein the filling station further includes a switch and wherein the filling station dispenses the chemical product solution through the fluid passage and into the product package when the fitment insert is mated with the docking connector and upon actuation of the switch.

Example 5

The refillable dispensing system of Example 1, wherein the fitment insert body further comprises a vent bore defining a venting passage from the first side of the fitment insert body to the second side of the fitment insert body, a vent probe seal disposed around an circumferential interior ridge within the venting passage, and a tubular vent probe configured to fit within the venting passage, the vent probe biased to a closed position with respect to the vent probe seal, the vent probe further disposed to slide within the venting passage between the closed position and an open position.

Example 6

The refillable dispensing system of Example 1, wherein the vent probe further includes a shoulder, and wherein the vent probe shoulder forms a seal with the vent probe seal when the vent probe is in the closed position, and wherein air may leave the product package when the vent probe is in the open position.

Example 7

The refillable dispensing system of Example 1, wherein vent probe further includes a vent probe tip accessible through the vent bore from the first side of the fitment insert body.

Example 8

The refillable dispensing system of Example 7 wherein the docking connector further includes a vent tab configured to depress the vent probe tip and move the vent probe from the closed position to the open position when the fitment insert is mated with the docking connector.

Example 9

The refillable dispensing system of Example 1, wherein the barb member further includes longitudinally extending guide rails, and wherein the check ball is further disposed to slide within the guide rails between the closed position and the open position.

Example 10

The refillable dispensing system of Example 1 wherein the product package comprises a high density polyethylene resin having a density greater than 0.953 g/cc.

Example 11

A fitment insert that forms a sealed port through which a product package may be filled with a fluid chemical product, comprising a fitment insert body including a first bore defining a fluid passage from a first side of the fitment insert body to a second side of the fitment insert body, the fitment insert body further including an interior wall forming a circumferential ridge around the interior of the fluid passage, a tubular barb member having a first end and a second end and configured to fit within the fluid passage of the fitment insert body with the first end disposed toward the first side of the fluid passage, the barb member having a second bore extending from the first end to the second end, a seal disposed between the first end of the barb member and the circumferential ridge, and a check ball that is spring-biased to a closed position with respect to the seal within the fluid passage, the check ball further disposed to slide within the second bore between the closed position and an open position.

Example 12

The fitment insert of Example 11, the fitment insert body further comprising a vent bore defining a venting passage from the first side of the fitment insert body to the second side of the fitment insert body, a vent probe seal disposed around an circumferential interior ridge within the venting passage, and a tubular vent probe configured to fit within the venting passage, the vent probe biased to a closed position with respect to the vent probe seal, the vent probe further disposed to slide within the venting passage between the closed position and an open position.

Example 13

The fitment insert of Example 12, wherein the vent probe further includes a shoulder, and wherein the vent probe shoulder forms a seal with the vent probe seal when the vent probe is in the closed position, and wherein air may leave the product package when the vent probe is in the open position.

Example 14

The fitment insert of Example 12, wherein vent probe further includes a vent probe tip accessible through the vent bore from the first side of the fitment insert body.

Example 15

The fitment insert of Example 11, wherein the barb member further includes longitudinally extending guide rails, and wherein the check ball is further disposed to slide within the guide rails between the closed position and the open position.

Example 16

The fitment insert of Example 11, the fitment insert body further comprising a circumferential rim disposed around the first side of the fitment insert body; and a plurality of circumferential fitment tabs disposed around a sidewall of the fitment insert body, the fitment tabs and circumferential rim configured to receive a neck of the product package.

Example 17

The fitment insert of Example 11 wherein the check ball comprises stainless steel.

Example 18

The fitment insert of Example 11 wherein the product package comprises a high density polyethylene resin having a density greater than 0.953 g/cc.

Example 19

A refillable product package comprising the fitment insert of Example 11.

Example 20

The refillable product package of Example 19, further comprising a product bottle having a neck, wherein the fitment insert body is fitted within the neck of the product bottle.

Example 21

A refillable product package comprising a product package having a one or more sidewalls and a neck, and a fitment insert that forms a sealed port through which a product package may be filled with a fluid chemical product, the fitment insert comprising a fitment insert body configured to sealably fit within the neck of the product package, the fitment insert body including a first bore defining a fluid passage from a first side of the fitment insert body to a second side of the fitment insert body, the fitment insert body further including an interior wall forming a circumferential ridge around the interior of the fluid passage, a tubular barb member having a first end and a second end and configured to fit within the fluid passage of the fitment insert body with the first end disposed toward the first side of the fluid passage, the barb member having a second bore extending from the first end to the second end, a seal disposed between the first end of the barb member and the circumferential ridge, and a check ball that is spring-biased to a closed position with respect to the seal within the fluid passage, the check ball further disposed to slide within the second bore between the closed position and an open position.

Various examples have been described. These and other examples are within the scope of the following claims.

The invention claimed is:

1. A fitment insert that forms a sealed port through which a product package may be filled with a fluid chemical product, comprising:
   a fitment insert body including a first bore defining a fluid passage from a first side of the fitment insert body to a second side of the fitment insert body, the fitment insert body further including an interior wall forming a circumferential ridge around the interior of the fluid passage;
   a tubular barb member having a first end and a second end and configured to fit within the fluid passage of the fitment insert body with the first end disposed toward the first side of the fluid passage, the barb member having a second bore extending from the first end to the second end;
   a seal disposed between the first end of the barb member and the circumferential ridge; and
   a check ball biased to a closed position with respect to the seal, the check ball further disposed to slide within the second bore between the closed position and an open position,
   wherein the fitment insert body further comprises:
   a vent bore defining a venting passage from the first side of the fitment insert body to the second side of the fitment insert body;
   a tubular vent probe configured to fit within the venting passage and biased to a closed position, the vent probe further disposed to slide within the venting passage between the closed position and an open position to allow air to leave the product package through the vent bore when the vent probe is in the open position.

2. The fitment insert of claim 1, wherein the fitment insert body further comprises:
   a vent probe seal disposed around a circumferential interior ridge within the venting passage; and wherein the vent probe is biased to a closed position with respect to the vent probe seal.

3. The fitment insert of claim 2, wherein the vent probe further includes a shoulder, and wherein the vent probe shoulder forms a seal with the vent probe seal when the vent probe is in the closed position, and wherein air may leave the product package when the vent probe is in the open position.

4. The fitment insert of claim 2, wherein vent probe further includes a vent probe tip accessible through the vent bore from the first side of the fitment insert body.

5. The fitment insert of claim 1, wherein the tubular barb member further includes longitudinally extending guide rails, and wherein the check ball is further disposed to slide within the guide rails between the closed position and the open position.

6. The fitment insert of claim 1, the fitment insert body further comprising:
a circumferential rim disposed around the first side of the fitment insert body, the circumferential rim configured to receive a neck of the product package.

7. The fitment insert of claim 1, wherein the check ball comprises stainless steel.

8. A refillable product package comprising the fitment insert of claim 1.

9. The refillable product package of claim 8, further comprising a product bottle having a neck, wherein the fitment insert body is fitted within the neck of the product bottle.

10. A refillable product package comprising:
a product package having one or more sidewalls and a neck; and
a fitment insert that forms a sealed port through which the product package may be filled with a fluid chemical product, the fitment insert comprising:
  a fitment insert body configured to sealably fit within the neck of the product package, the fitment insert body including a first bore defining a fluid passage from a first side of the fitment insert body to a second side of the fitment insert body, the fitment insert body further including an interior wall forming a circumferential ridge around the interior of the fluid passage;
  a tubular barb member having a first end and a second end and configured to fit within the fluid passage of the fitment insert body with the first end disposed toward the first side of the fluid passage, the barb member having a second bore extending from the first end to the second end;
  a seal disposed between the first end of the barb member and the circumferential ridge; and
  a check ball biased to a closed position with respect to the seal, the check ball further disposed to slide within the second bore between the closed position and an open position,
wherein the fitment insert body further comprises:
a vent bore defining a venting passage from the first side of the fitment insert body to the second side of the fitment insert body; and
a tubular vent probe configured to fit within the venting passage and biased to a closed position, the vent probe further disposed to slide within the venting passage between the closed position and an open position to allow air to leave the product package through the vent bore when the vent probe is in the open position.

11. The refillable product package of claim 10, the fitment insert body further comprising:
a circumferential rim disposed around the first side of the fitment insert body, the circumferential rim configured to receive the neck of the product package.

12. The refillable product package of claim 10, wherein the product package comprises a high density polyethylene resin having a density greater than 0.953 g/cc.

13. The refillable product package of claim 10, wherein the fitment insert is configured to mate with a docking connector of a filling station that dispenses a chemical product, the docking connector further comprising:
a docking connector body having circumferential tabs configured to depress the vent probe of the fitment insert and allow air to leave the product package when the fitment insert is mated with the docking connector; and
a fill probe configured to depress the check ball from the first side of the fitment insert body and move the check ball from the closed position to the open position when the fitment insert is mated with the docking connector.

14. The refillable product package of claim 10, further comprising an output port configured to mate with a dispenser pump, such that a discrete quantity of the chemical product is dispensed from the output port of the refillable product package when the dispenser pump is actuated.

15. The refillable product package of claim 13, wherein the filling station mixes a chemical product concentrate with a diluent to form a chemical product solution, and wherein the filling station dispenses the chemical product solution.

16. The refillable product package of claim 13 wherein the filling station further includes a switch and wherein the filling station further dispenses the chemical product through the fluid passage and into the refillable product package when the fitment insert is mated with the docking connector and upon actuation of the switch.

17. The refillable product package of claim 10, wherein the fitment insert body further comprises:
a vent probe seal disposed around a circumferential interior ridge within the venting passage; and wherein the vent probe is biased to a closed position with respect to the vent probe seal.

18. The refillable product package of claim 17, wherein the vent probe further includes a shoulder, and wherein the vent probe shoulder forms a seal with the vent probe seal when the vent probe is in the closed position, and wherein air may leave the product package when the vent probe is in the open position.

19. The refillable product package of claim 17, wherein vent probe further includes a vent probe tip accessible through the vent bore from the first side of the fitment insert body.

20. The refillable product package of claim 10, wherein the tubular barb member further includes longitudinally extending guide rails, and wherein the check ball is further disposed to slide within the guide rails between the closed position and the open position.

* * * * *